(12) United States Patent
Kim et al.

(10) Patent No.: US 10,851,746 B2
(45) Date of Patent: Dec. 1, 2020

(54) CONTROLLER OF FUEL SYSTEM FOR VEHICLE

(71) Applicants: Hyundai Motor Company, Seoul (KR); Kia Motors Corporation, Seoul (KR)

(72) Inventors: Chang Han Kim, Gwangju (KR); Jong Ki Kim, Gyeonggi-do (KR); Jae Min Lee, Chungcheongnam-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 135 days.

(21) Appl. No.: 16/149,841

(22) Filed: Oct. 2, 2018

(65) Prior Publication Data

US 2019/0383250 A1 Dec. 19, 2019

(30) Foreign Application Priority Data

Jun. 18, 2018 (KR) .................... 10-2018-0069399

(51) Int. Cl.
| | |
|---|---|
| *F02M 37/00* | (2006.01) |
| *F02M 25/08* | (2006.01) |
| *F02M 37/10* | (2006.01) |
| *B01D 46/10* | (2006.01) |
| *B01D 46/42* | (2006.01) |
| *B60K 15/03* | (2006.01) |

(Continued)

(52) U.S. Cl.
CPC ..... *F02M 37/0011* (2013.01); *B01D 46/0002* (2013.01); *B01D 46/10* (2013.01); *B01D 46/4218* (2013.01); *B60K 15/03* (2013.01); *F02M 25/089* (2013.01); *F02M 25/0854* (2013.01); *F02M 37/007* (2013.01); *F02M 37/103* (2013.01); *B01D 2277/30* (2013.01); *B01D 2279/40* (2013.01); *B60K 2015/03236* (2013.01); *B60K 2015/03243* (2013.01); *F02M 2037/085* (2013.01)

(58) Field of Classification Search
CPC combination set(s) only.
See application file for complete search history.

(56) References Cited

U.S. PATENT DOCUMENTS

| | | | |
|---|---|---|---|
| 6,865,080 B2 * | 3/2005 | Radosevich | .......... B60L 15/007 361/699 |
| 7,086,493 B2 * | 8/2006 | Knight | .................... F02D 41/22 123/497 |

(Continued)

FOREIGN PATENT DOCUMENTS

| | | |
|---|---|---|
| JP | H07-006463 B2 | 1/1995 |
| JP | 2008-297904 A | 12/2008 |

(Continued)

*Primary Examiner* — Angelisa L. Hicks
(74) *Attorney, Agent, or Firm* — Mintz Levin Cohn Ferris Glovsky and Popeo, P.C.; Peter F. Corless

(57) ABSTRACT

A controller of a fuel system for a vehicle is provided in which heat is dissipated outside from a printed circuit board to cool the controller. The dissipated heat is utilized to maximize the efficiency of the purge operation using a canister by waste heat. The controller is integrated with an air filter for removing foreign substances from air to be suctioned into a canister, and is configured to realize heat exchange between air passing through the air filter and a motor driver.

12 Claims, 6 Drawing Sheets

(51) Int. Cl.
*B01D 46/00* (2006.01)
*F02M 37/08* (2006.01)

(56) References Cited

U.S. PATENT DOCUMENTS

| | | | | |
|---|---|---|---|---|
| 7,642,459 | B2* | 1/2010 | Motoda | F02M 37/103 |
| | | | | 174/17 VA |
| 9,657,698 | B2* | 5/2017 | Park | F02M 37/04 |
| 9,689,340 | B2* | 6/2017 | Song | F02D 41/3082 |
| 2004/0231518 | A1* | 11/2004 | Johnson | B01D 46/0036 |
| | | | | 96/134 |
| 2017/0036151 | A1* | 2/2017 | Callahan | B01D 46/0032 |
| 2017/0211530 | A1* | 7/2017 | Fukuoka | B60K 15/035 |

FOREIGN PATENT DOCUMENTS

| | | |
|---|---|---|
| JP | 5939090 B2 | 6/2016 |
| KR | 10-1481264 B1 | 1/2015 |
| KR | 10-1543100 B1 | 8/2015 |

\* cited by examiner

CONTROLLER OF FUEL SYSTEM FOR VEHICLE

CROSS-REFERENCE TO RELATED APPLICATION

This application claims under 35 U.S.C. § 119(a) the benefit of priority to Korean Patent Application No. 10-2018-0069399 filed on Jun. 18, 2018, the entire contents of which are incorporated herein by reference.

BACKGROUND

(a) Technical Field

The present invention relates to a controller of a fuel system for a vehicle, and more particularly, to a controller of a fuel system for a vehicle that is integrated with an air filter.

(b) Background Art

In general, a fuel system of a vehicle includes a fuel tank for storing fuel therein, a fuel pump for pumping the fuel stored in the fuel tank to supply the fuel to an engine, a fuel filter for removing foreign substances from the fuel to be supplied to the engine, and fuel lines, such as a fuel supply line and a fuel return line, for transferring the fuel therethrough.

As an exemplary fuel system, a fuel system of a liquefied petroleum gas (LPG) vehicle includes a bombe (e.g., a fuel tank) for storing LPG therein, a fuel pump for pumping the LPG stored in the bombe to supply the same to an engine, a controller for operating the fuel pump, a fuel supply line for supplying the LPG pumped by the fuel pump to an injector of the engine, a fuel return line for collecting unused fuel from the engine and returning the same to the bombe, and a regulator valve installed in the fuel return line. Typically, the fuel pump is installed inside the bombe, and the bombe is installed inside the trunk of the vehicle.

Similar to the fuel system of an LPG vehicle, a fuel system of a gasoline vehicle includes a fuel tank for storing gasoline therein, a fuel pump for pumping the fuel stored in the fuel tank to supply the same to an engine, a controller for operating the fuel pump, and a fuel supply line for supplying the fuel pumped by the fuel pump to an injector of the engine. In a fuel system of a vehicle, a controller may include a motor driver, electrical wiring and a connector to operate a fuel pump (particularly, a motor of a pump). The motor driver may be configured such that elements for operating the fuel pump, such as a switching element (e.g. an FET) and a condenser, are mounted to a printed circuit board (PCB).

The motor driver receives signals output from an engine control unit (ECU) in response to engine-driving conditions, and operates the motor of the fuel pump. When the motor driver receives pulse width modulation (PWM) signals, the switching element of the inverter is driven in response to the PWM signals, and converts direct current into three-phase alternating current. The motor of the fuel pump is driven by receiving this three-phase alternating current.

At this time, the speed (revolutions per minute, RPM) of the pump motor may be adjusted in several stages in response to the PWM signals. The connectors of the controller of the fuel system may include a connector for connection with a power source, a connector for input/output of signals, and a connector for output of the three-phase alternating current, converted by the switching element of the inverter, to the pump motor.

In the related art, a controller is manufactured as a separate component, and is installed to a fuel tank. Thus, a mounting bracket for fixing the controller to the fuel tank is required. Further, in the related art, complex electrical wiring and connectors are required to electrically interconnect the controller and the fuel pump, and clamps for fixing electrical wiring to the periphery of the fuel tank are also required. Accordingly, a fuel pump module, in which a controller is integrated with a fuel pump, has been proposed.

According to the controller-integrated fuel pump module disclosed in the related art, electrical wiring, connectors, a separate controller housing and a mounting bracket are eliminated by integrating a controller with a fuel pump, and therefore the number of parts and manufacturing costs are reduced. Further, problems generated due to complex and long electrical wiring between the controller and the fuel pump, that is, electrical noise generation and motor-applied voltage drop, which has a negative influence on motor performance, may be alleviated.

However, in a fuel system for a vehicle, a controller adjusts the supply of fuel to an engine in stages by adjusting the rotational speed (RPM) of a fuel pump (i.e. the rotational speed (RPM) of a motor) according to engine-driving conditions. At this time, a substantial amount of heat is generated from elements on a printed circuit board due to the continuous power consumption of the controller. Therefore, cooling is required to protect inner circuits of a motor driver. However, the related art is not equipped with a device for cooling the controller, and thus the durability of the controller is deteriorated.

In general, a vehicle is equipped with a canister for collecting and storing fuel evaporation gas generated from a fuel tank to prevent atmospheric pollution. The canister includes a case filled with an adsorbent material for adsorbing hydrocarbon (HC) from the fuel evaporation gas generated from the fuel tank. Activated carbon is widely used for the adsorbent material. The activated carbon of the canister serves to adsorb hydrocarbon, which is a fuel component, from the fuel evaporation gas introduced into the case.

When the engine is stopped, the canister adsorbs fuel evaporation gas (particularly, a fuel component such as hydrocarbon) using activated carbon. When the engine is driven, the fuel evaporation gas adsorbed to the activated carbon is desorbed by the pressure of air suctioned from the outside, and the desorbed gas is supplied to an intake system of the engine together with air.

The operation of supplying fuel evaporation gas collected in the canister to the engine is referred to as a purge operation. The fuel evaporation gas generated from the fuel tank is collected in the canister, and is then purged to the intake system of the engine through a purge control solenoid valve (PCSV) and combusted in the engine when the engine is driven. In particular, a typical canister includes a case filled with activated carbon. The case includes a purge port, which is connected with an intake system of an engine to supply fuel evaporation gas to the engine, a loading port, which is connected with a fuel tank and into which fuel evaporation gas is introduced, and an atmosphere port, which is connected with an air filter and into which atmospheric air is suctioned.

The case further includes a partition wall that partitions the internal space of the case into a space in which the atmosphere port is located and a space in which the purge port and the loading port are located. While fuel evaporation gas introduced into the case through the loading port passes through the internal space partitioned by the partition wall, hydrocarbon, which is a fuel component, is adsorbed to activated carbon.

While the engine is driven, the PCSV operated by the ECU is opened, whereby the intake pressure, i.e. engine negative pressure, is applied to the internal space of the canister from the engine through the purge port. Accordingly, air is suctioned into the canister through the air filter and the atmosphere port, and the gas desorbed from the activated carbon is discharged from the canister through the purge port by the air and is introduced into the engine.

To accomplish this purge operation, in which atmospheric air is suctioned into the canister, and in which a fuel component, such as hydrocarbon, is desorbed from activated carbon in the canister by the suctioned air and is introduced into the engine, engine negative pressure needs to be applied to the canister through a purge line and a purge port. However, a fuel system has recently been designed to reduce the number of engine purge operations to improve the fuel efficiency of a vehicle. Particularly, in continuously variable valve lift (CVVL) engines or HEV/PHEV engines, the number of purge operations is inevitably reduced due to a reduction in the engine negative pressure generation period.

Recently, there has been no technology available to improve purge efficiency in spite of a reduction in the number of purge operations. Further, there is no separate external energy source available to improve purge efficiency. Thus, purge efficiency in the related art is insufficient. Accordingly, it is difficult to satisfy the requirements of regulations on evaporation gas. Therefore, there is increasing need for improvement of purge efficiency in consideration of a reduction in the number of engine purge operations.

Further, in the related art, an air filter for a canister is manufactured as a separate component, which has a configuration in which a filtering member is mounted inside a case, and is installed to a specific position in a vehicle, such as a filler neck or a fuel tank. Thus, a separate mounting bracket or fastening member for fixing the air filter to the filler neck or the fuel tank is required, leading to an increase in the number of parts and manufacturing costs.

The above information disclosed in this section is merely for enhancement of understanding of the background of the invention, and therefore it may contain information that does not form the prior art that is already known in this country to a person of ordinary skill in the art.

SUMMARY

The present invention provides a controller of a fuel system for a vehicle, in which heat is dissipated outside from a printed circuit board to cool the same and the dissipated heat is effectively utilized so that the efficiency of the purge operation using a canister may be maximized using waste heat, and in which the number of parts and manufacturing costs may be reduced.

In one aspect, the present invention provides a controller of a fuel system for a vehicle that may include a mounting member mounted to a fuel tank, the mounting member being integrally provided at the top surface thereof with an accommodation portion and the top surface of the mounting member being a surface exposed to the outside of the fuel tank, a motor driver mounted in the accommodation portion to operate a motor of a fuel pump, and an air filter having a filter case, a filter module disposed in the filter case to remove foreign substances from air, an inlet port for allowing air to be introduced into the filter case therethrough, and an outlet port for allowing air, from which foreign substances have been removed while passing through the filter module, to be discharged from the filter case therethrough, wherein the filter case is formed integrally with the accommodation portion to realize heat exchange between air passing through the filter case and the motor driver, and a diaphragm is mounted between an internal space in the accommodation portion and an internal space in the filter case to separate the internal space in the accommodation portion and the internal space in the filter case from each other.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
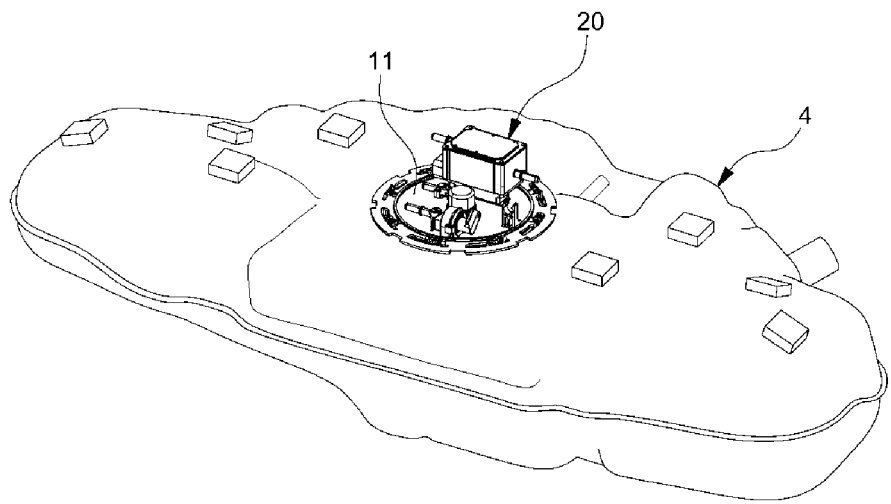
FIG. 1 is a perspective view illustrating the installation state of an air-filter-integrated controller according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes, will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term e of stated features, integers, steps, operations, elements, and/or components, but do no Hereinafter, exemplary embodiments of the present invention will be described in detail with reference to the accompanying drawings. The exemplary embodiments of the present invention to be described below are provided by way of example so that the idea of the present invention can be sufficiently transferred to those skilled in the art to which the present invention pertains. Therefore, the present invention is not limited to the exemplary embodiments set forth herein, but may be modified in many different forms.

The present invention provides a controller of a fuel system for a vehicle, in which heat is dissipated outside from elements of a printed circuit board to cool the same and the dissipated heat is effectively utilized so that the efficiency of a purge operation using a canister may be maximized using waste heat, and in which the number of parts and manufacturing costs may be reduced.

The controller of the present invention may be configured to operate a fuel pump (particularly, a motor of a pump) in a fuel system. As described below, the controller may be integrated with a plate, to which the fuel pump is coupled, whereby the controller may be modularized with the fuel pump. In other words, the controller according to the present invention may be integrated with the fuel pump, and thus, a controller-integrated fuel pump module is provided.

In particular, the controller according to the present invention may be integrally equipped with a cooling device configured to cool heat-emitting parts, such as elements of a printed circuit board, by absorbing heat generated therefrom. The cooling device may be configured to dissipate heat, which is generated during the operation of the controller, to the outside. In the exemplary embodiment of the present invention, the cooling device may be implemented by an air filter, through which cold air in the atmosphere to be suctioned into a canister passes. In other words, heat-emitting parts of the controller may be cooled through heat exchange between cold air, which is suctioned from the atmosphere and passes through the interior of the air filter, and the heat-emitting parts of the controller.

Accordingly, the air filter and the controller may be modularized in an integral type. The air-filter-integrated controller, modularized in this manner, may be disposed on a mounting member that is secured to a fuel tank. According to the present invention, the mounting member, on which the modularized air-filter-integrated controller is disposed, may be a plate to which the fuel pump is coupled (hereinafter, referred to as a 'fuel pump plate'), as described above. In other words, a controller-integrated fuel pump module, particularly, a controller-integrated fuel pump module with which an air filter is additionally modularized, may be provided.

While cold air in the atmosphere passes through the air filter, it exchanges heat with the controller, thereby absorbing heat generated from the controller and consequently cooling the controller. At the same time, the air passing through the air filter may be heated by the heat transferred from the controller. The air heated in this manner may be suctioned into the canister through an atmosphere port. By virtue of this application of external thermal energy, the efficiency of a purge operation using the canister, i.e. purge efficiency, may be increased.

In summary, the configuration in which the air filter and the controller are modularized in an integral type to exchange heat with each other may exhibit improved cooling performance of the controller as well as improved purge efficiency, and may also enable the reuse of thermal energy, i.e. utilization of waste heat, which is generated from the controller and is wasted uselessly in the related art, to heat air that is to be suctioned into the canister.

Hereinafter, the configuration of the air-filter-integrated controller according to the exemplary embodiment of the present invention will be described in detail with reference to the drawings.

Figure 2:
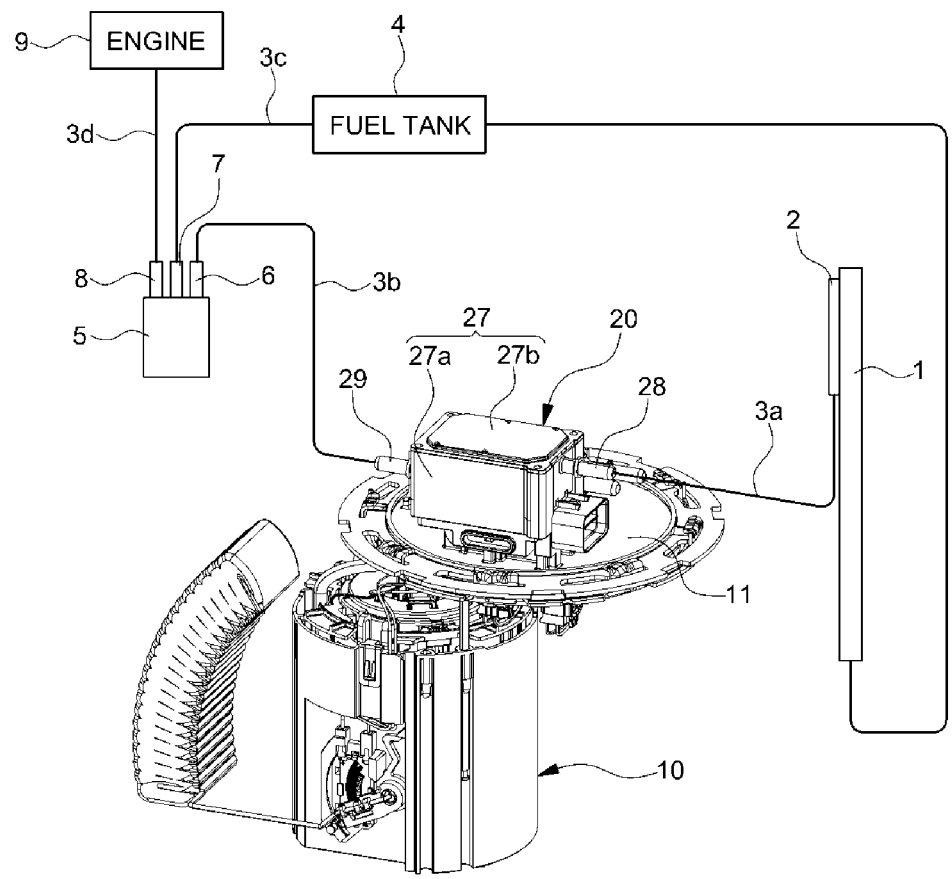
FIG. 2 is an enlarged perspective view of the air-filter-integrated controller according to the exemplary embodiment of the present invention.
Figure 3:
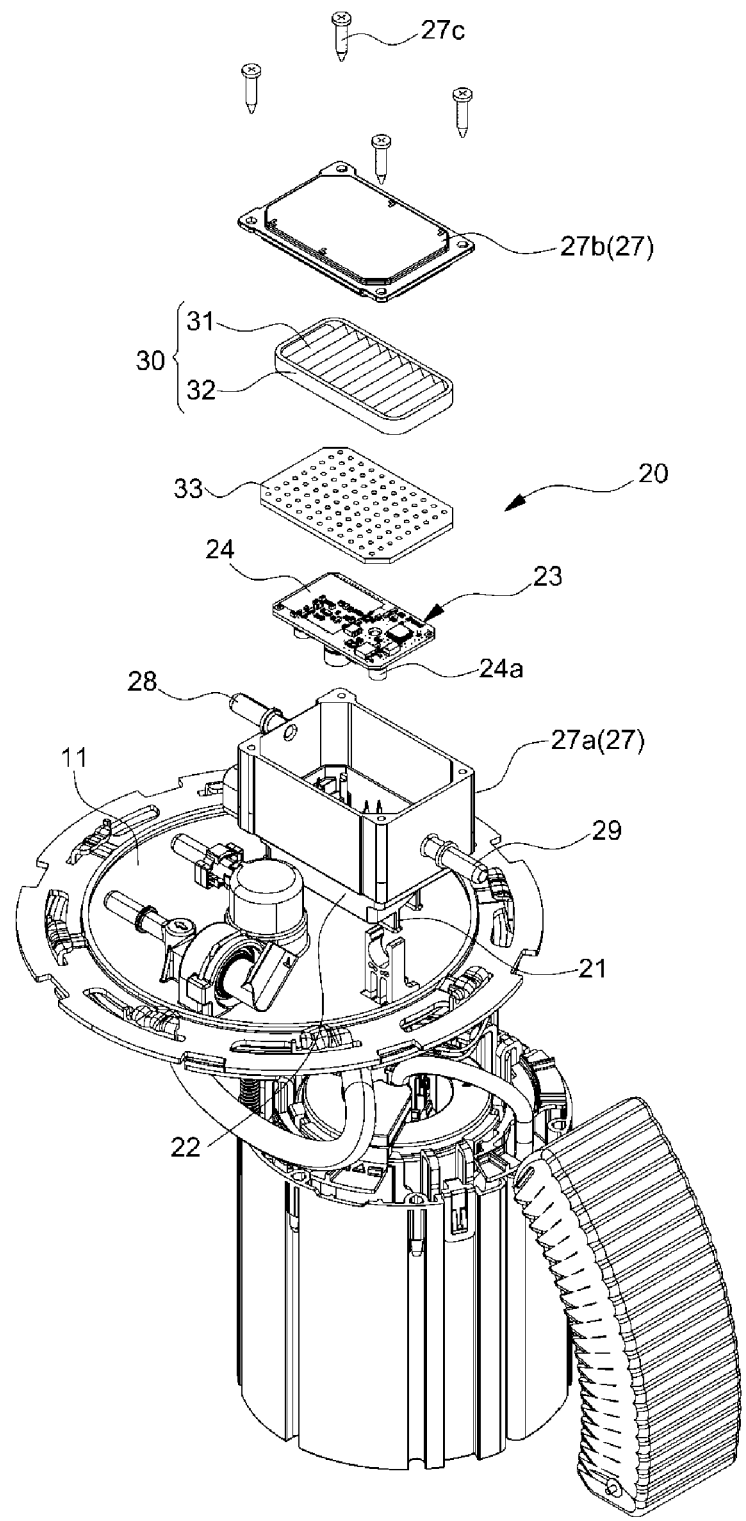
FIG. 3 is a detailed view of the air-filter-integrated controller according to the exemplary embodiment of the present invention.
Figure 4:
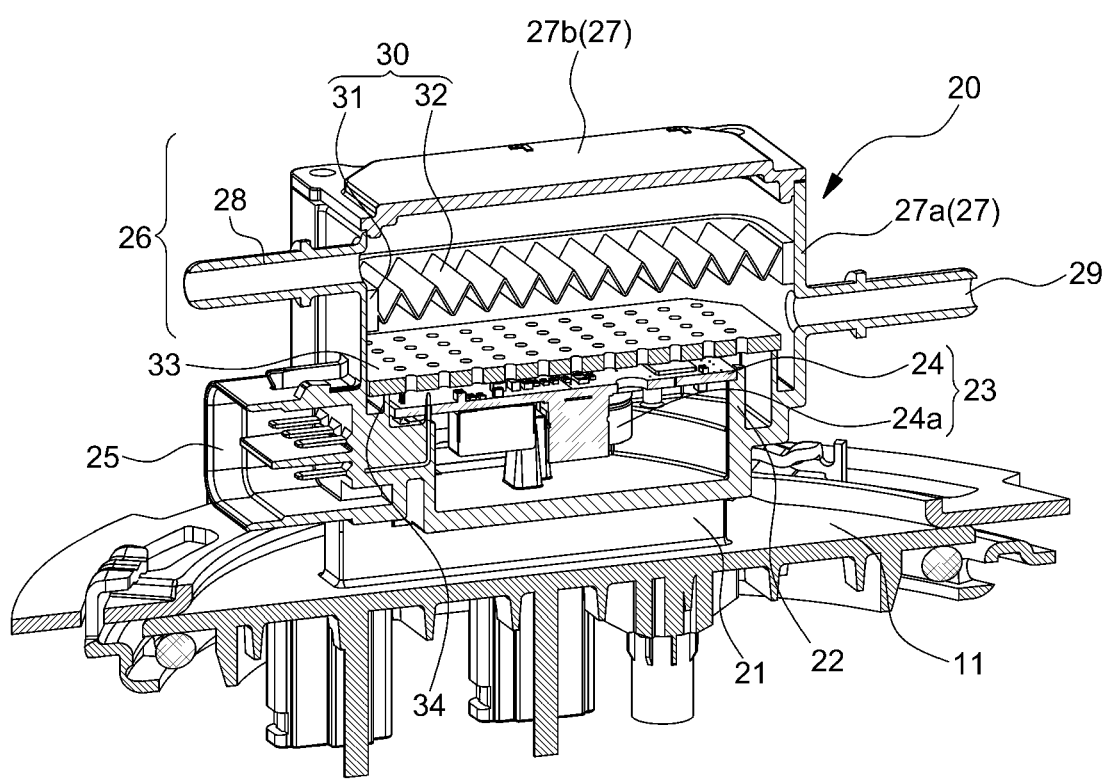
FIG. 4 is a cross-sectional perspective view of the air-filter-integrated controller according to the exemplary embodiment of the present invention.
Figure 5:
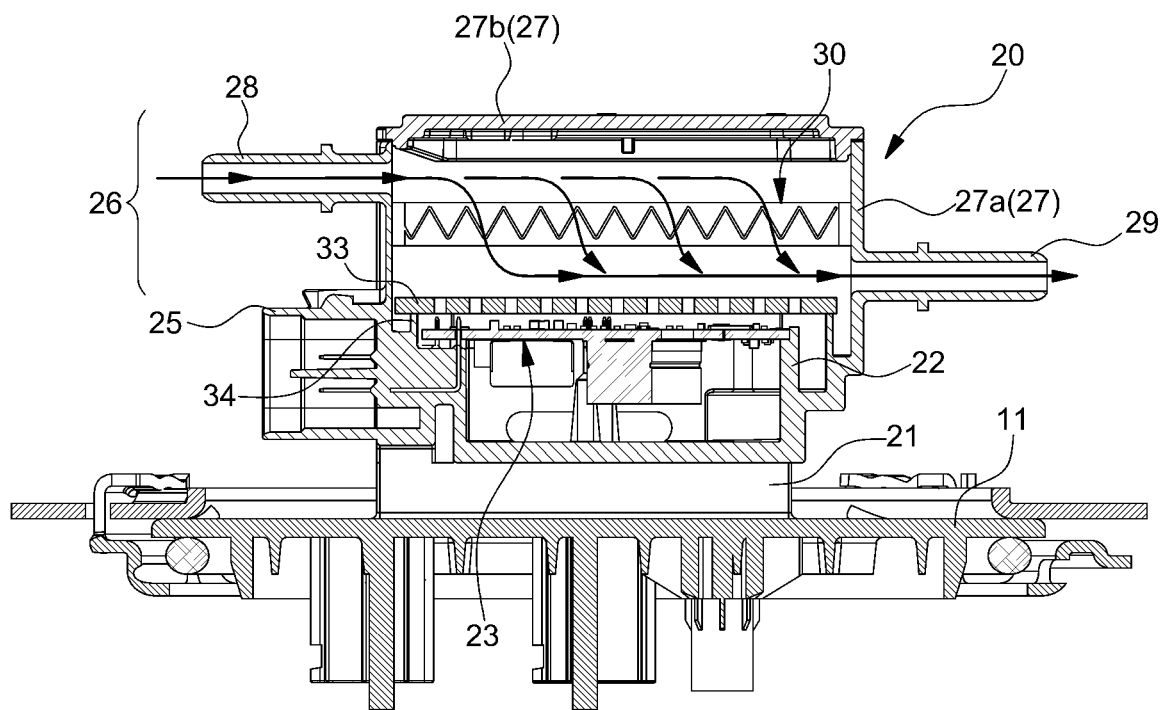
FIG. 5 is a cross-sectional view of the air-filter-integrated controller according to the exemplary embodiment of the present invention.

FIG. 1 is a perspective view illustrating the installation state of the air-filter-integrated controller according to the exemplary embodiment of the present invention, FIG. 2 is an enlarged perspective view of the air-filter-integrated controller according to the exemplary embodiment of the present invention, and FIG. 3 is a detailed view of the air-filter-integrated controller according to the exemplary embodiment of the present invention. FIG. 4 is a cross-sectional perspective view of the air-filter-integrated controller according to the exemplary embodiment of the present invention, and FIG. 5 is a cross-sectional view of the air-filter-integrated controller according to the exemplary embodiment of the present invention.

In FIG. 2, reference numeral 5 denotes a canister, reference numeral 6 denotes an atmosphere port of the canister 5, which is connected to an air filter 26 via a tube 3b, reference numeral 7 denotes a loading port of the canister 5, which is connected to a fuel tank 4 via a tube 3c, and reference numeral 8 denotes a purge port of the canister 5, which is connected to an intake system of an engine 9 via a tube 3d.

A fuel pump 10, a fuel pump plate 11 to which the fuel pump 10 is coupled, and an air-filter-integrated controller 20 disposed on the fuel pump plate 11 may be installed at the fuel tank 4. However, in FIG. 2, the fuel pump 10, the fuel plate 11 and the air-filter-integrated controller 20 are illustrated as being provided separately from the fuel tank 4, and the sizes thereof are exaggerated for clarity of description.

As described above, the present invention has been made to improve the configuration of the related art, in which an air filter configured by mounting a filtering member in a separate case is used, and is characterized in that the air filter 26 is integrated with the controller 20 of the fuel system.

Particularly, the air filter 26 may be configured to filter air suctioned into the canister 5 from the atmosphere. The air, from which foreign substances have been removed while passing through a filter module 30 of the air filter 26, may be suctioned into the atmosphere port 6 of the canister 5 through the tube 3b. Further, in the present invention, a controller-integrated fuel pump module may be additionally modularized by integrating the air filter 26 with the controller 20. Through this configuration, canister purge efficiency may be improved, and the controller may be effectively cooled.

As shown in FIG. 2, in the fuel pump module, which includes the fuel pump 10 mounted inside the fuel tank 4 and the fuel pump plate 11 integrally coupled to the fuel pump 10, the controller 20 may be integrated with the fuel pump plate 11. Therefore, an integral-type fuel pump module in which the controller 20 is integrated with the fuel pump 10 via the fuel pump plate 11 and in which the air filter 26 is additionally integrated with the controller 20 may be provided. The fuel pump plate 11 fixes the air-filter-integrated controller 20 to the fuel tank 4 and to the fuel pump 10 located inside the fuel tank 4.

The fuel pump plate 11 is a plate-shaped member to which the fuel pump 10 is integrally coupled, and seals an opening (not shown) formed in the fuel tank 4 through the coupling with the fuel pump 10. The fuel tank 4 may include the canister 5, which collects fuel evaporation gas generated in the fuel tank 4 and supplies the collected fuel evaporation gas to the intake system of the engine during the purge operation. The canister 5 used in the present invention has the same configuration as that in the related art.

Further, according to the present invention, the air filter 26 is not mounted to a filler neck 1, but may be integrated and modularized with the controller 20 mounted to the fuel tank 4. In the present invention, the controller 20, with which the air filter 26 is integrated, may be integrally coupled to the outer surface of the fuel pump plate 11 and may be configured to operate the fuel pump 10. The fuel pump 10 may be coupled to the inner surface of the fuel pump plate 11 and may be located inside the fuel tank 4. The fuel pump plate 11 may be a mounting member for fixing the fuel pump 10 to the fuel tank 4. As shown in FIGS. 4 and 5, a support portion 21 protrudes from the top surface of the fuel pump plate 11, which is a surface exposed to the outside of the fuel tank 4, and an accommodation portion 22 having therein an internal space is formed integrally with the support portion 21.

In the exemplary embodiment of the present invention, the controller 20 may include a motor driver 23, which is accommodated in the internal space in the accommodation portion 22. Particularly, the accommodation portion 22 may be formed at the top surface (the outer surface) of the fuel pump plate 11 in the figure. In other words, the accommodation portion 22 may be formed at the outer surface of the fuel pump plate 11 mounted to the opening in the fuel tank 4, and thus the controller 20 may be disposed outside the fuel pump plate 11 (above the fuel pump plate 11 in the figure). In the present invention, the motor driver 23 may include an inverter configured to operate a motor of the fuel pump 10. The motor driver 23 may be configured such that constituent elements 24a of the inverter, such as a switching element (e.g. an FET) and a condenser, are mounted to a printed circuit board (PCB) 24.

In FIGS. 4 and 5, reference numeral 25 denotes a connector for connection with external devices. The connector 25 may include a terminal for receiving battery power, a terminal for enabling communication with an engine control unit (ECU) (not shown), etc. Thus, when the ECU is connected with the connector 25 of the controller 20, when the ECU outputs control signals for operating the fuel pump 10 according to engine-driving conditions, these control signals may be transmitted to the motor driver 23 through the connector 25.

In the present invention, the air filter 26 may include a filter case 27, which is formed integrally with the fuel pump plate 11 and allows air to pass through an internal space formed therein, and a filter module 30, disposed in the internal space in the filter case 27 to remove foreign substances from air. In the exemplary embodiment of the present invention, the filter case 27 may be formed in the shape of a case having an internal space or cavity therein, and may be disposed on the accommodation portion 22, which is disposed on the outer surface of the fuel pump plate 11, i.e. on the top surface of the fuel pump plate 11 in the figure.

The internal space in the accommodation portion 22, disposed at a lower side, and the internal space in the filter case 27, disposed at an upper side, may communicate with each other, and a diaphragm 33 may be disposed between these two internal spaces to separate the internal spaces from each other, which will be described later. As shown in FIGS. 4 and 5, the internal space in the filter case 27 may be disposed at the upper side of the motor driver 23. Therefore, the motor driver 23 may be cooled by air passing through the internal space in the filter case 27.

In other words, the controller 20 may be cooled by transferring the heat generated from the controller 20 to the air passing through the internal space in the air filter 26. At this time, the air introduced into the air filter 26 may pass through the filter module 30 while passing through the internal space in the air filter 26, and thus, foreign substances may be removed from the air. In addition, the air may pass through the space defined in the upper side of the motor driver 23 before being discharged from the air filter 26, thereby cooling the elements 24a.

In addition, while the air introduced into the air filter 26 passes through the space defined in the upper side of the motor driver 23, heat generated from the controller 20 may be transferred to the air, and thus the air may be heated and the temperature thereof increases. The heated air may be discharged from the air filter 26 and suctioned into the canister 5.

In the exemplary embodiment of the present invention, the filter case 27 may include a main body 27a, formed integrally with the fuel pump plate 11 and may include an internal space therein, and a cover 27b, detachably coupled to an open top portion of the main body 27a to seal the internal space in the main body 27a. The cover 27b may be coupled to the main body 27a by bolts, but is not limited thereto. In other words, to seal the internal space in the main body 27a, the cover 27b may be disposed on the top of the main body 27a, and then may be coupled to the main body 27a by inserting bolts 27c into fastening-bores (not shown) formed through the cover 27b from the upper side of the cover 27b and fastening the bolts 27c into fastening-bores formed in the main body 27a.

When the cover 27b is completely coupled to the main body 27a, the internal space in the main body 27a, i.e. the internal space in the filter case 27, becomes sealed to prevent leakage of air to the outside. The filter module 30 may be fixedly installed in the internal space in the air filter 26, i.e. in the internal space in the filter case 27, which becomes sealed when the cover 27b is coupled to the main body 27a.

The filter module 30 may include a filtering member 31, which removes foreign substances from air passing therethrough, and a frame 32, coupled to the inner surface of the air filter 26 (the inner surface of the filter case) to fix and support the filtering member 31. The filtering member 31 and the frame 32 may be integrated with each other with the edges of the filtering member 31 coupled and fixed to the frame 32. The filter module 30 configured as described above may be assembled with the filter case 27 by seating the frame 32 on a seating portion (not shown) that protrudes from the inner surface of the filter case 27 or by fitting the frame 32 into a fitting portion (not shown) formed in the inner surface of the filter case 27. However, the filter module 30 may also be assembled with the filter case 27 in various other manners, as long as the frame 32 may be secured to the interior of the filter case 27.

In the exemplary embodiment of the present invention, as illustrated, the filter module 30 may be arranged horizontally to partition the internal space in the air filter 26 into an upper space and a lower space. In other words, the filter module 30 may be arranged horizontally in the main body 27a of the filter case 27 to partition the internal space in the air filter 26 (the internal space in the filter case 27) into an upper space and a lower space. Based on the air flow direction, the upper space defined above the filtering member 31 of the filter module 30 may form an upstream space, and the lower space defined under the filtering member 31 may form a downstream space.

Air is introduced into the upper space defined above the filtering member 31 in the internal space in the air filter 26, may pass through the filtering member 31 to remove foreign substances therefrom Then, the air may move to the lower space defined under the filtering member 31 and be discharged to the outside of the air filter 26. The filter case 27 of the air filter 26 may include an inlet port 28 and an outlet port 29. As illustrated, the inlet port 28 and the outlet port 29 may be formed at the main body 27a of the filter case 27. Of the two spaces into which the internal space in the filter case 27 is partitioned by the filtering member 31, the inlet port 28 may be formed to communicate with the upstream space, and the outlet port 29 may be formed to communicate with the downstream space.

Referring to FIGS. 4 and 5, the inlet port 28 may be formed at an upper portion of the filter case 27 to communicate with the space defined on the filtering member, which is the upstream space, and the outlet port 29 may be formed at a lower portion of the filter case 27 to communicate with the space defined under the filtering member, which is the downstream space. Accordingly, air introduced into the upper space in the air filter 26 through the inlet port 28 may move to the lower space in the air filter 26 through the filtering member 31. The air, from which foreign substances have been removed while passing through the filtering member 31, may be discharged to the outside of the air filter 26 through the outlet port 29.

Further, while passing through the internal space in the air filter 26, the air may cool the motor driver 23 of the controller 20, and may be increased in temperature by receiving heat from the motor driver 23. The high-temperature air may be discharged to the outside through the outlet port 29. The inlet port 28 may be connected to an air inflow portion 2 disposed at the filler neck 1 via a tube 3a, and the outlet port 29 may be connected to the atmosphere port 6 of the canister 5 via the tube 3b.

Therefore, during the purge operation, atmospheric air may be suctioned into the air inflow portion 2 of the filler neck 1 and may be introduced into the air filter 26 via the tube 3a and the inlet port 28. Subsequently, the air may pass through the filter module 30 in the air filter 26 to remove foreign substances therefrom, may be discharged through the output port 29, and then may be supplied to the atmosphere port 6 of the canister 5 via the tube 3b. Subsequently, fuel evaporation gas adsorbed to activated carbon in the canister 5 may be desorbed by the pressure of air suctioned thereinto via the air filter 26, and then may be supplied to the intake system of the engine 9 together with the air. Finally, the mixture of the fuel evaporation gas and the air may be combusted in the engine.

Accordingly, the temperature of the air to be suctioned into the canister 5 during the purge operation may be increased using waste heat generated from the controller 20. Thus, a fuel component may be desorbed more easily from the activated carbon in the canister 5 by the high-temperature air, and accordingly, desorption efficiency and purge efficiency may be improved. In addition, the controller 20 may be cooled by cold air passing through the air filter 26, and accordingly the circuits of the controller 20 may be protected and the durability thereof may be increased.

In general, a fuel component (HC or the like) adsorbed to the activated carbon in the canister may be maintained in a micro-liquid state, and then desorbed from the activated carbon and may be purged while being vaporized. To facilitate desorption of the fuel component from the activated carbon, external energy such as thermal energy or the like is required. Accordingly, while air to be suctioned into the canister 5 passes through the air filter 26, the air may receive heat in the process of cooling the controller 20. The air, heated and filtered in this manner, may be suctioned into the canister 5, and provide heat required for desorption of the fuel component. The introduction of the heated air into the canister 5 may improve the desorption efficiency and purge efficiency in the canister 5.

In addition to the above-described purge operation, when excessive negative pressure is formed in the fuel tank 4, external air may be introduced into the fuel tank 4 via the air filter 26. Even in this case, the air introduced from the outside may be filtered while passing through the air filter 26, thereby enabling protection of the fuel system. Since the filter module 30 is contaminated by accumulation of foreign substances therein after a certain period of use, the filter module 30 needs to be replaced at a prescribed cycle.

When the filter module 30 is replaced with a new filter module, the cover 27b may be separated from the main body 27a by releasing the bolts 27c, and the filter module 30 may be removed the main body 27a. Subsequently, a new filter module may be installed in the main body 27a, and the cover 27b may be coupled back to the main body 27a. In the related art, an entire air filter including a case must be replaced. However, according to the present invention, it may be possible to replace only the filter module 30 with a new one, and accordingly maintenance costs may be reduced compared to the related art.

In addition, in the exemplary embodiment of the present invention, since the filter case 27, particularly the main body 27a, is formed integrally with the fuel pump plate 11, manufacturing of a separate air filter case may be eliminated. In addition, since a separate bracket or fastening member for fixing or mounting the air filter to the vehicle may be eliminated, the number of parts and manufacturing costs may be reduced.

The filter case 27 may be further provided therein with a diaphragm 33, disposed between the air filter 26 located at the upper side of the filter case 27 and the motor driver 23 located at the lower side of the filter case 27. The diaphragm 33 may separate the air filter space and the controller space from each other. Particularly, the controller space refers to a space in which the motor driver 23 and the accommodation portion 22 are located.

To allow air to move from the air filter 26 to the motor driver 23 and vice versa, the diaphragm 33 may be implemented by a porous plate, through which a plurality of apertures is formed, or may be implemented by a plate formed of a porous material having therein pores through which air may pass. In addition, the diaphragm 33 may be mounted above the accommodation portion 22 inside the filter case 27. At this time, the diaphragm 33 may be mounted above the motor driver 23 mounted in the accommodation portion 22 to be spaced apart therefrom by a predetermined distance.

In particular, the diaphragm 33 may be mounted to be located at a position that corresponds to the lower end of the internal space in the filter case 27, i.e. at an approximate boundary between the filter case 27 and the accommodation portion 22 located thereunder. In addition, to fix the location of the diaphragm 33, a mounting portion 34 for fixing and supporting the diaphragm 33 may be formed at the filter case 27 or the accommodation portion 22.

Figure 6:
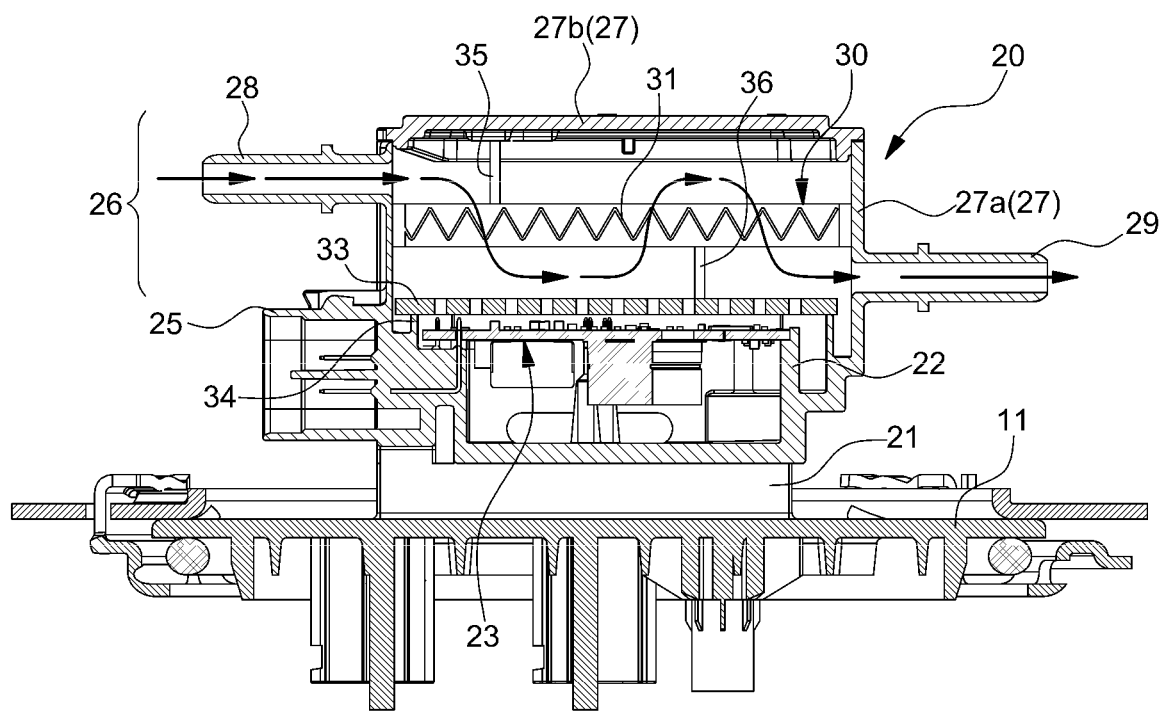
FIG. 6 is a cross-sectional view illustrating an air-filter-integrated controller according to another exemplary embodiment of the present invention.

FIG. 6 is a cross-sectional view illustrating an air-filter-integrated controller according to another exemplary embodiment of the present invention, and the configuration thereof will now be described. The embodiment of FIG. 6 has a structure that increases an amount of time during which air passes through the interior of the air filter 26. The increase in the amount of time during which air passes through the interior of the air filter 26 allows a greater amount of heat to be transferred from the controller 20 to air.

In the exemplary embodiment of FIG. 6, a first partition wall 35 may be formed at the upper inner surface of the filter case 27, particularly, at the inner surface of the cover 27b of the filter case 27, to extend downwards. The first partition wall 35 may be formed to partition the space above the filtering member 31 of the filter module 30. In addition, a second partition wall 36 may be formed at the top surface of the diaphragm 33 to extend upwards. The second partition wall 36 may be formed to partition the space under the filtering member 31 of the filter module 30. The first partition wall 35 may be formed at a position closer to the side surface of the filter case 27, in which the inlet port 28 is formed, than the second partition wall 36.

Additionally, the lower end of the first partition wall 35 may come into contact with the top surface of the filtering member 31 to prevent a gap from forming between the first partition wall 35 and the filter module 30. In the same manner, the upper end of the second partition wall 36 may come into contact with the bottom surface of the filtering member 31 to prevent a gap from forming between the second partition wall 36 and the filter module 30. More particularly, sealing members 38 may be attached to the lower end of the first partition wall 35 and the upper end of the second partition wall 36 to seal gaps, which may be formed between the lower end of the first partition wall 35 and the filtering member 31 and between the upper end of the second partition wall 36 and the filtering member 31.

In the exemplary embodiment of FIG. 6, the first partition wall 35 and the second partition wall 36 define a relatively long and winding air flow path within the air filter 26. The movement of air inside the air filter 26 will now be described. In the exemplary embodiment of FIG. 6, air may be introduced into the air filter 26, i.e. into the space above the filter module 30 in the filter case 27, through the inlet port 28. Subsequently, the air may pass through a portion of the filtering member, which is located between the side surface of the filter case 27, in which the inlet port 28 is formed, and the first partition wall 35, and may move into the space under the filter module 30.

Subsequently, the air may pass through a portion of the filtering member, disposed between the first partition wall 35 and the second partition wall 36, and may move into the space above the filter module 30. Subsequently, the air may pass through a portion of the filtering member, disposed between the second partition wall 36 and the side surface of the filter case 27, in which the outlet port 29 is formed, and may move into the space under the filter module 30. Finally, the air may be discharged outside the air filter 26 through the outlet port 29.

As described above, in the exemplary embodiment of FIG. 6, the air introduced into the air filter 26 may move along the zigzag-shaped path, which is crooked up and down, whereby the time taken for the air to pass through the air filter increases. This crooked zigzag-shaped path in the air filter 26, along which air moves, is longer than the air flow path in the air filter 26 in the exemplary embodiment of FIGS. 1 to 5. This allows cold air to stay in the air filter 26 for a relatively long time while moving along a relatively long path in the air filter 26.

As described above, according to the exemplary embodiment of FIG. 6, the time during which cold air stays in the air filter 26 increases, and thus the contact time between the motor driver 23 and the air increases. As a result, the cooling efficiency and durability of the controller 20 may be improved. In addition, with the increase in the contact time between the cold air and the motor driver 23 of the controller 20, the air, which is to be supplied to the canister, may receive a greater amount of heat from the controller 20 (e.g., an increase in the contact time between air and waste heat). In other words, waste heat generated from the controller 20 may be effectively utilized.

Figure 7:
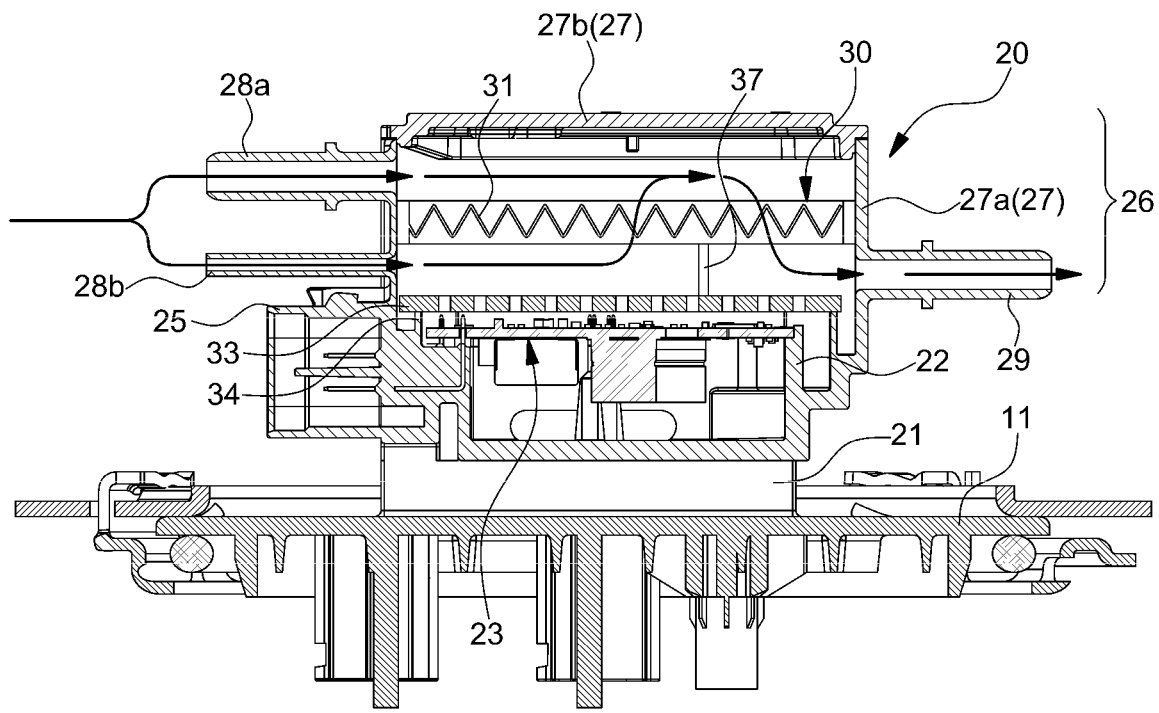
FIG. 7 is a cross-sectional view illustrating an air-filter-integrated controller according to a further exemplary embodiment of the present invention.

FIG. 7 is a cross-sectional view illustrating an air-filter-integrated controller according to a further exemplary embodiment of the present invention. In the exemplary embodiment of FIG. 7, a plurality of air flow paths may be formed in the air filter 26. Particularly, the plurality of air flow paths refers to different paths along which air moves respectively in the filter case 27. Accordingly, in the exemplary embodiment of FIG. 7, air introduced into the air filter 26, i.e. into the filter case 27, through the inlet port 28 may be distributed to the air flow paths and moves respectively therealong.

In addition, in the exemplary embodiment of FIG. 7, while the air introduced into the filter case 27 moves along the respective paths, the air may pass through different portions of the filtering member of the filter module 30. Accordingly, the filter case 27 of the air filter 26 may include two inlet ports 28a and 28b in the side surface thereof, namely a first inlet port 28a and a second inlet port 28b. The first inlet port 28a may be formed at a relatively high position to communicate with the space above the filtering member 31 of the filter module 30 in the filter case 27. The second inlet port 28b may be formed at a relatively low position to communicate with the space under the filtering member 31 of the filter module 30 in the filter case 27.

The tube 3a (refer to FIG. 2), which extends from the air inflow portion 2 (refer to FIG. 2), may be divided into two parts, and the two divided tubes may be respectively connected to the first inlet port 28a and the second inlet port 28b. In particular, in the exemplary embodiment of FIG. 7, the outlet port 29 may be formed at the filter case 27 to communicate with one of the two spaces under the filter module 30, which are partitioned by a partition wall 37, the first inlet port 28a may be formed at the filter case 27 to communicate with the space above the filter module 30, and the second inlet port 28b may be formed at the filter case 27 to communicate with the remaining one of the two partitioned spaces under the filter module 30.

Therefore, as shown in FIG. 7, air may be introduced into the air filter 26 through two divided paths. In this exemplary embodiment, the cross-sectional area of the flow path formed in the first inlet port 28a may be greater than the cross-sectional area of the flow path formed in the second inlet port 28b. Accordingly, the inner diameter of the first inlet port 28a may be greater than the inner diameter of the second inlet port 28b.

Through this configuration, the amount of air introduced through the first inlet port 28a may be substantial. In other words, the amount of air introduced through the second inlet port 28b may be less than the amount of air introduced through the first inlet port 28a. The partition wall 37 may be formed on the top surface of the diaphragm 33 to extend upwards. This partition wall 37 may partition the space under the filtering member 31 of the filter module 30. The upper end of the partition wall 37 may come into contact with the bottom surface of the filtering member 31 to prevent a gap from forming between the partition wall 37 and the filter module 30. More particularly, a sealing member 38 may be attached to the upper end of the partition wall 37 to seal a gap, which may be formed between the upper end of the partition wall 37 and the filtering member 31.

In the exemplary embodiment of FIG. 7, having the above-described configuration, while the air introduced into the filter case 27 moves along the respective paths, the air may pass through different portions of the filtering member of the filter module 30. Particularly, air may be introduced into the space above the filtering member 31 of the filter module 30 through the first inlet port 28a. Subsequently, the air may pass through a portion of the filtering member, located between the partition wall 37 and the side surface of the filter case 27, in which the outlet port 29 is formed, and may move into the space under the filter module 30.

Meanwhile, air may also be introduced into the space under the filtering member 31 of the filter module 30 through the second inlet port 28b. Subsequently, the air may pass through a portion of the filtering member, which is located between the side surface of the filter case 27, in which the second inlet port 28b is formed, and the partition wall 37, may move into the space above the filter module 30, and may be mixed with the air introduced through the first inlet port 28a. Subsequently, the mixed air may pass through the filtering member 31 and into the space under the filter module 30.

As described above, in the exemplary embodiment of FIG. 7, the air introduced through the second inlet port 28b and the air introduced through the first inlet port 28a may move along the different paths while passing through different portions of the filtering member 31 of the filter module 30. In particular, in the exemplary embodiment of FIG. 7, the air introduced into the air filter 26 through the second inlet port 28b may pass through the filtering member 31 of the filter module 30 from the space under the filter module to the space above the filter module, and subsequently may pass through the filtering member 31 from the space above the filter module to the space under the filter module. Accordingly, at least a portion of the air that passes through the air filter 26 may move along the crooked path within the air filter 26, whereby the time during which air stays in the air filter 26 may increase.

As described above, according to the exemplary embodiment of FIG. 7, the time during which cold air stays in the air filter 26 increases, and thus the contact time between the motor driver 23 and the air increases. As a result, the cooling efficiency and durability of the controller 20 may be improved. In addition, with the increase in the contact time between the cold air and the motor driver 23, the air may receive a greater amount of heat (e.g., an increase in the contact time between air and waste heat). In other words, waste heat generated from the controller 20 may be effectively utilized.

In addition, in the exemplary embodiment of FIG. 7, the air introduced through the first inlet port 28a may pass through a portion of the filtering member of the filter module 30, which is proximate to the outlet port 29, and the air introduced through the second inlet port 28b may pass through a portion of the filtering member of the filter module 30, which is distant from the outlet port 29. Accordingly, in the exemplary embodiment of FIG. 7, the entire region of the filtering member 31 of the filter module 30 may be used more evenly than in the exemplary embodiment of FIGS. 1 to 5, thus increasing the lifespan of the air filter 26 and thus the lifespan of the filtering member 31.

As is apparent from the above description, according to the controller of a fuel system for a vehicle of the present invention, the temperature of the air to be suctioned into the canister during the purge operation may be increased using waste heat generated from the controller. Thus, a fuel component may be desorbed more easily from the activated carbon in the canister by the high-temperature air, and accordingly desorption efficiency and purge efficiency may be improved.

In addition, the controller may be cooled by cold air passing through the air filter, and accordingly the circuits of the controller may be protected and the durability thereof may be increased. Since the filter case, particularly the main body thereof, may be formed integrally with the fuel pump plate, the manufacturing of a separate air filter case may be eliminated. In addition, since a separate bracket or fastening member for fixing or mounting the air filter to a given position in the vehicle may be eliminated, the number of parts and manufacturing costs may be reduced.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A controller of a fuel system for a vehicle, comprising:
    a mounting member mounted to a fuel tank, the mounting member being integrally provided at a top surface of the fuel tank with an accommodation portion and the top surface of the mounting member being a surface exposed to an outside of the fuel tank;
    a motor driver mounted in the accommodation portion to operate a motor of a fuel pump; and
    an air filter including a filter case, a filter module disposed in the filter case to remove foreign substances from air, an inlet port for allowing air to be introduced into the filter case therethrough, and an outlet port for allowing air, from which foreign substances have been removed while passing through the filter module, to be discharged from the filter case therethrough,
    wherein the filter case is formed integrally with the accommodation portion to realize heat exchange between air passing through the filter case and the motor driver,
    wherein a diaphragm is mounted between an internal space in the accommodation portion and an internal space in the filter case to separate the internal space in the accommodation portion and the internal space in the filter case from each other, and wherein the filter case includes:
a main body formed integrally with the accommodation portion, the main body having therein an internal space in which the filter module is mounted; and
a cover detachably coupled to the main body to seal the internal space in the main body.

2. The controller of claim 1, wherein the mounting member is a fuel pump plate that includes a bottom surface to which the fuel pump is integrally coupled, the fuel pump being disposed inside the fuel tank.

3. The controller of claim 1, wherein a support portion protrudes from a top surface of the fuel pump plate, and wherein the accommodation portion is formed integrally with the support portion.

4. The controller of claim 1, wherein the outlet port of the filter case is connected to an atmosphere port of a canister for collecting fuel evaporation gas via a tube, and during a purge operation of the canister, air in the air filter is suctioned into the atmosphere port via the outlet port and the tube, and desorption of the fuel evaporation gas is realized in the canister.

5. A controller of a fuel system for a vehicle, comprising:
a mounting member mounted to a fuel tank, the mounting member being integrally provided at a top surface of the fuel tank with an accommodation portion and the top surface of the mounting member being a surface exposed to an outside of the fuel tank;
a motor driver mounted in the accommodation portion to operate a motor of a fuel pump; and
an air filter including a filter case, a filter module disposed in the filter case to remove foreign substances from air, an inlet port for allowing air to be introduced into the filter case therethrough, and an outlet port for allowing air, from which foreign substances have been removed while passing through the filter module, to be discharged from the filter case therethrough,
wherein the filter case is formed integrally with the accommodation portion to realize heat exchange between air passing through the filter case and the motor driver,
wherein a diaphragm is mounted between an internal space in the accommodation portion and an internal space in the filter case to separate the internal space in the accommodation portion and the internal space in the filter case from each other, and
wherein the diaphragm is any one of a porous plate having apertures formed therethrough and a plate formed of a porous material having therein pores through which air passes.

6. A controller of a fuel system for a vehicle, comprising:
a mounting member mounted to a fuel tank, the mounting member being integrally provided at a top surface of the fuel tank with an accommodation portion and the top surface of the mounting member being a surface exposed to an outside of the fuel tank;
a motor driver mounted in the accommodation portion to operate a motor of a fuel pump; and
an air filter including a filter case, a filter module disposed in the filter case to remove foreign substances from air, an inlet port for allowing air to be introduced into the filter case therethrough, and an outlet port for allowing air, from which foreign substances have been removed while passing through the filter module, to be discharged from the filter case therethrough,
wherein the filter case is formed integrally with the accommodation portion to realize heat exchange between air passing through the filter case and the motor driver,
wherein a diaphragm is mounted between an internal space in the accommodation portion and an internal space in the filter case to separate the internal space in the accommodation portion and the internal space in the filter case from each other, and
wherein the filter module is arranged horizontally in the filter case to partition the internal space in the filter case into a first space above the filter module and a second space under the filter module.

7. The controller of claim 6, wherein the air filter further includes:
a first partition wall formed at an upper inner surface of the filter case to extend downwards to partition the first space above the filter module; and
a second partition wall formed at a top surface of the diaphragm to extend upwards to partition the second space under the filter module,
wherein the inlet port is formed at the filter case to communicate with the first space above the filter module, and
wherein the outlet port is formed at the filter case to communicate with the second space under the filter module.

8. The controller of claim 7, wherein the first partition wall is formed at a position closer to a side surface of the filter case, in which the inlet port is formed, than the second partition wall.

9. The controller of claim 7, wherein a first sealing member is provided at a lower end of the first partition wall and a second sealing member is provided at an upper end of the second partition wall to seal a gap between the first partition wall and the filter module and a gap between the second partition wall and the filter module.

10. The controller of claim 6, wherein the air filter further includes:
a partition wall formed at a top surface of the diaphragm to extend upwards to partition the second space under the filter module into two spaces,
wherein the outlet port is formed at the filter case to communicate with one of the two spaces into which the second space under the filter module is partitioned, and
wherein the inlet port includes:
a first inlet port formed at the filter case to communicate with the first space above the filter module; and
a second inlet port formed at the filter case to communicate with a remaining one of the two spaces into which the second space under the filter module is partitioned.

11. The controller of claim 10, wherein a sealing member is provided at an upper end of the partition wall to seal a gap between the partition wall and the filter module.

12. The controller of claim 10, wherein a cross-sectional area of a flow path formed in the first inlet port is greater than a cross-sectional area of a flow path formed in the second inlet port.

* * * * *